May 30, 1944.   L. S. WOOD   2,350,141
DUMP VEHICLE AND STABILIZER CONSTRUCTION
Filed June 10, 1942   2 Sheets-Sheet 2

INVENTOR
Louis S. Wood.
BY
Harness, Dickey & Pierce
ATTORNEYS.

Patented May 30, 1944

2,350,141

UNITED STATES PATENT OFFICE 2,350,141

DUMP VEHICLE AND STABILIZER CONSTRUCTION

Louis S. Wood, Grosse Pointe Farms, Mich., assignor to Gar Wood Industries, Inc., Detroit, Mich., a corporation of Michigan Application June 10, 1942, Serial No. 446,487

4 Claims. (Cl. 298—22)

The present invention relates to dump vehicle constructions, and particularly to dump trailer or semi-trailer constructions.

One of the primary objects of the present invention is to provide improvements in vehicles of the type mentioned in which the strain normally present in the chassis frame due to the reaction of the body lift hoist during dumping is relieved, thereby permitting the use of longer chassis and longer bodies.

A further object of the invention is to provide improvements in vehicles of the type mentioned whereby longer trailers and longer bodies may be used without the need of additional reinforcement in the chassis frame.

Another object of the invention is to provide improvement in vehicles of the type mentioned whereby longer trailers and longer bodies may be used so that capacity loads may be carried on all axles in states where legal restrictions now make this impractical.

Another object of the invention is to provide improvements in vehicles of the type mentioned in which means are provided for supporting and stabilizing a trailer on uneven ground while a dump body on the trailer is being raised.

Another object of the invention is to provide a hoisting and stabilizing means in which the stabilizer serves to relieve the strain imposed on the chassis when the body is being raised or which may be used for raising the semi-trailer above the tractor and supporting the semi-trailer when it is disconnected from the tractor.

Other objects of the invention will become apparent from the following specification, the drawings relating thereto, and from the claims hereinafter set forth.

In the drawings, in which like numerals are used to designate like parts in the several different views throughout:

Figure 1:
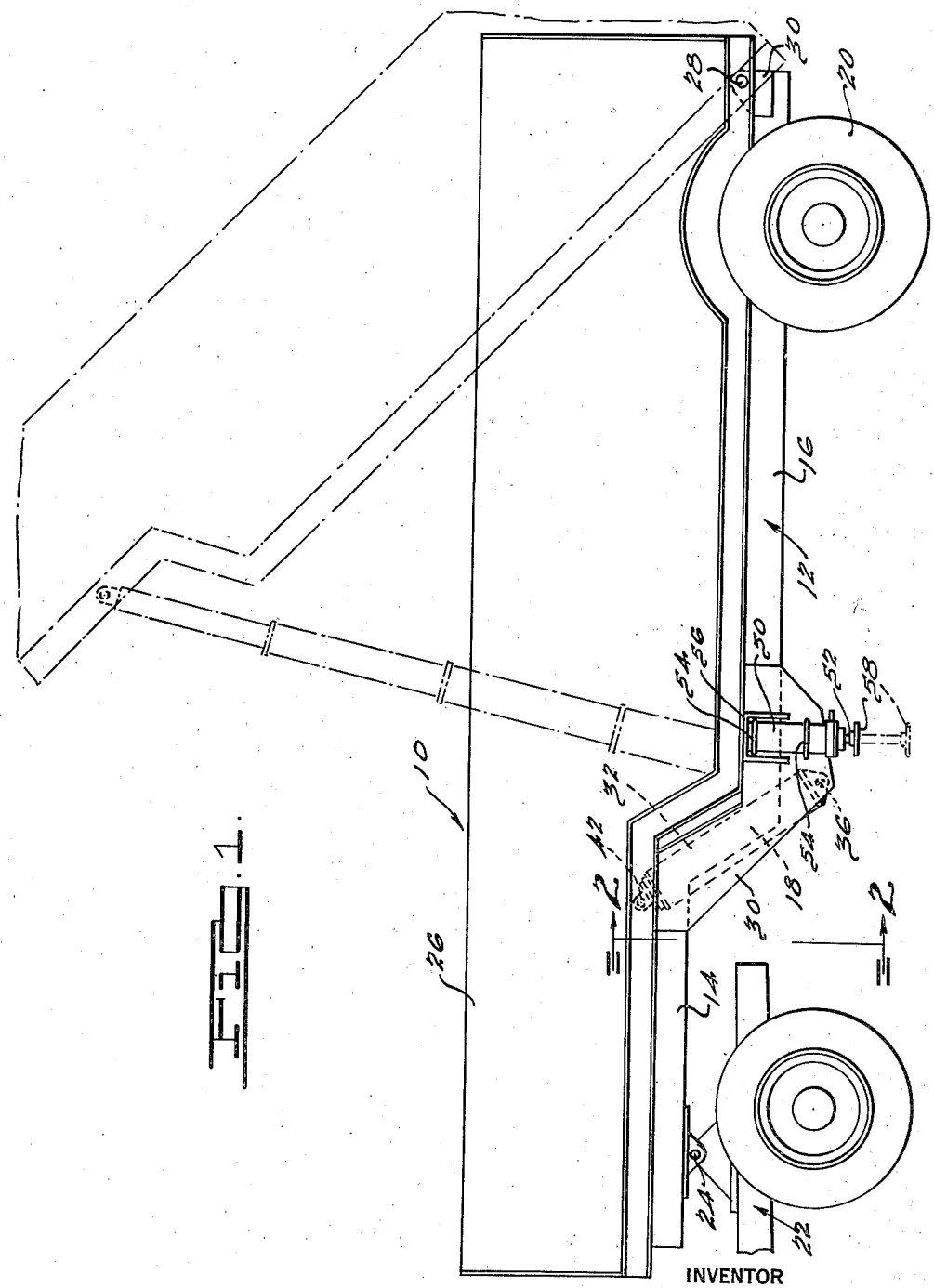
Figure 1 is a partial, side elevational view of a semi-trailer dump vehicle having hoisting means and stabilizer according to the present invention associated therewith and showing such semi-trailer connected to the rear end of an automotive tractor.
Figure 2:
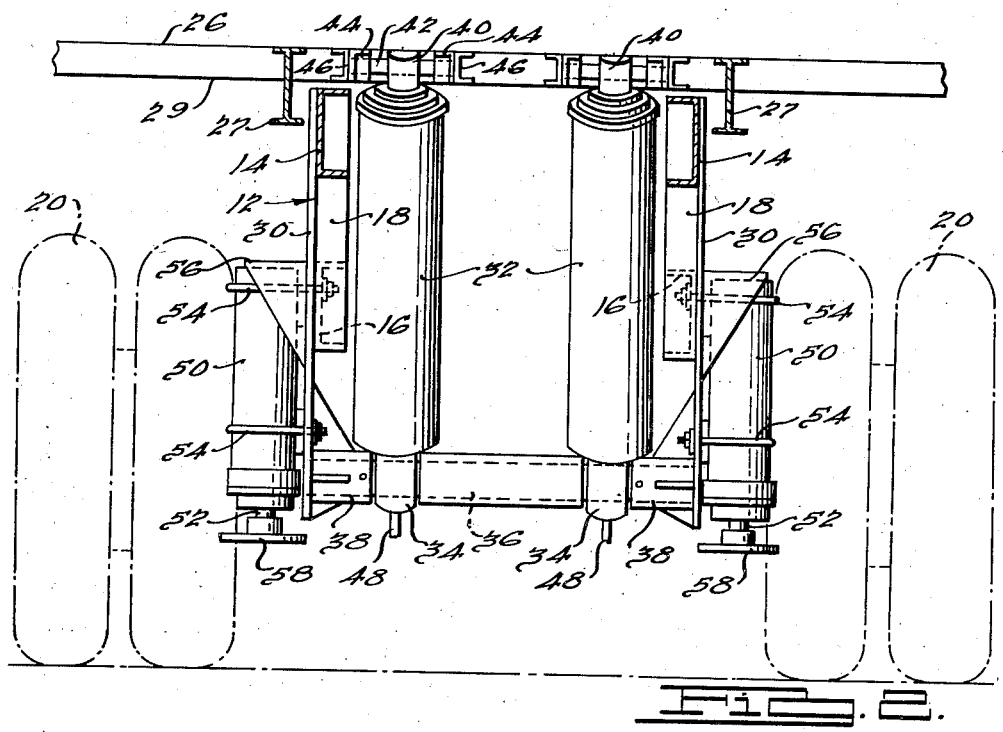
Figure 2 is an enlarged cross-sectional view taken substantially along the line 2—2 of Figure 1.

Referring to the drawings, a drop frame type of semi-trailer vehicle is generally indicated at 10 and such vehicle includes a drop frame chassis generally indicated at 12. Such chassis 12 includes a front, or forward, substantially horizontal portion 14, a rear substantially horizontal portion 16, and an intermediate portion 18. The horizontal portion 16 is at a lower level than the horizontal portion 14, and the intermediate portion 18 slopes downwardly and rearwardly between the front and rear horizontal portions. The usual ground engaging wheels 20 are connected to the chassis 12 adjacent the rear end thereof in the usual way.

The chassis 12 is pivotally connected to the rear end of an automotive tractor generally indicated at 22. Only the rear end of such tractor is shown, but it will be understood that it is of conventional construction with the cab and engine mounted adjacent the forward end thereof. The connection between the forward end of the chassis with the tractor is through a conventional fifth wheel construction, indicated at 24. It will be understood that the semi-trailer 10 may be disconnected from the tractor 22 in the usual way.

A dump body 26 is tiltably supported on the chassis by means of pivots 28 which are located at each side of the body adjacent the rear end of the body and chassis. The dump body 26 may include the usual longitudinal beam members 27 and transverse frame members 29 which support a receptacle formed with the usual side wall, front wall, floor, and pivoted rear gate. The pivots 28 may be suitably secured to upstanding supporting brackets 30 mounted on opposite sides of the chassis which co-operate with complementary brackets secured to the body for the reception of the pivot pins 28 to pivotally mount the body with respect to the chassis.

Transversely spaced mounting plates 30 are mounted to the chassis 12 and depend therefrom. In the embodiment illustrated, such plates are disposed adjacent the drop frame portion 18 and are secured to the drop portion 18 and to the adjacent parts of horizontal portions 14 and 16. The plates may be suitably secured to the frame members, for example, by welding.

The plates 30 serve as the mounting means for the hydraulic hoisting structure and also for the ground engaging hydraulic stabilizers.

The hydraulic hoisting means for tilting the body includes a pair of conventional telescopic hoists 32, the lower ends of which are formed with integral pivot eyes 34. Such eyes receive therethrough a pivot shaft 36, the ends of which are received in bearing members 38. Such bearing members 38 are suitably fixed to the inside faces of the plates 30 adjacent the lower edges thereof.

The usual plungers 40 project through the opposite ends of the hoist 32 and are pivotally connected through pivot pins 42 with the underside of the dump body 26. To provide such pivotal connection, the ends of the pivot pins 42 may be received within bearings 44 which are secured to channel members 46. Such channel members 46 may be suitably secured to the frame member of the body or to the floor thereof.

Means are provided for introducing fluid, preferably oil, under pressure through conduit 48 into the lower end of the outer cylinder 32. It will be appreciated that when the fluid under pressure is introduced into the lower end of the cylinder the telescoping jacks are extended to tilt the body about the pivots 28. When the load has been dumped and the pressure released from the conduit 48, the weight of the body will return the fluid through conduit 48. The details of the hydraulic circuit will be discussed hereinafter.

It will be appreciated that when the lifting force is applied to jacks 32, there is a considerable reaction force placed upon the chassis frame 12, particularly in the region of pivot shaft 36. When long bodies or long chassis are used, which is desirable, it will be seen that this reaction force is substantial. Heretofore, the practice has been to brace that portion of the chassis frame by the use of heavier sections or by reinforcing plates. This results in a comparatively heavy and expensive frame structure. According to the present invention hydraulic stabilizers in the form of jacks 50 are provided which are adapted to engage the ground so that the reaction force from the lifting jack is taken through the stabilizing jacks 50. By this means, the frame is relieved of the strains which would be normally present and the frame need not be reinforced to provide for excessive reaction forces of the hoisting jacks 32.

The hoisting jacks 50 include the usual cylinders having pistons and rods 52 associated therewith. The jacks 50 are vertically disposed with respect to the plates 30, and secured thereto by straps 54. Reinforcing angle plates 56 are fixed to the outer faces of the plates 30 and are so positioned that the ends of the cylinders 50 abut against the outwardly projecting flanges of the angle plates 56. The piston rods 52 project downwardly toward the ground and the projecting ends thereof have enlarged ground engaging plates 58 secured thereto.

It will thus be seen that when fluid under pressure is introduced into the upper ends of the cylinders 50, the piston rods 52 are projected downwardly so that the plates 58 engage the ground and serve to support the chassis frame in the region of the point of pivotal connection of the hoisting jacks 32 with the chassis frame. When fluid under pressure is introduced into the lower ends of the cylinders 50, the ground engaging plates 58 are raised to an out-of-the-way position.

Figure 3:
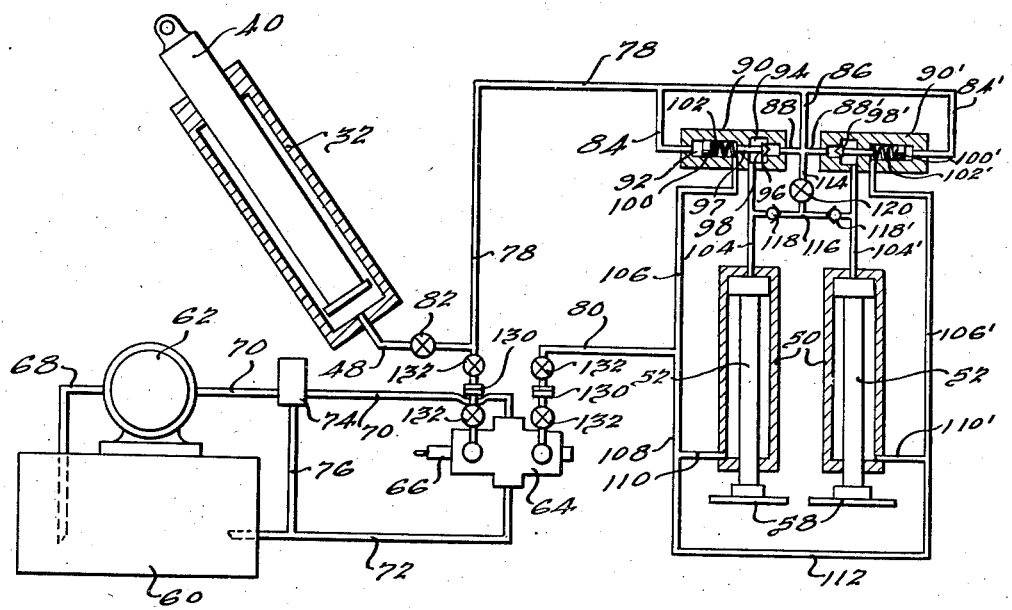
Figure 3 is a diagrammatic view illustrating the hoisting means, the stabilizing means, and the hydraulic control circuit therefor.

Referring to Figure 3, an hydraulic circuit for the control and operation of the hoisting jacks 32 and the stabilizing jacks 50 is diagrammatically illustrated. Such system includes a tank, or receptacle, 60 for oil having a pump 62 associated therewith. A conventional four-way valve 64 is provided, having the usual shiftable plunger mounted therein. The end of such plunger projects outwardly of the valve housing, as indicated at 66, and is adapted to be connected to a control means for shifting the plunger in the usual way.

The tank, pump and valve are preferably mounted on the tractor, and the pump is driven from a power take-off in the usual way. The inlet side of the pump is connected to a conduit 68, which depends into the tank 62 and below the lowest level of the oil therein for the purpose of supplying the oil to the pump. The outlet side of the pump is connected through a conduit 70 with the high pressure inlet port of the valve 64. A third conduit 72 communicates with the low pressure outlet of the valve 64 and returns to the tank 60.

A pressure release valve 74 is interposed in the high pressure conduit 70 and has a by-pass conduit 76 which communicates with the return conduit 72. Thus, the pump may operate continuously and when the fluid is not being distributed to the jacks the release valve 74 will open to return the fluid to the tank through conduits 76 and 72 and the fluid may thus circulate through the by-pass.

A conduit 78 communicates with one of the ports of the four-way valve 64. It will be understood that the valve plunger may be shifted so that the high pressure fluid may be introduced into either of the conduits 78 and 80, and when such high pressure fluid is introduced into one of these conduits, the other returns the fluid through the valve and into the return line 72.

The conduits 48 for the hoisting or lifting jacks 32 communicate with the conduit 78, and have a shut-off valve 82 interposed therein.

Conduits 84, 86 and 84' communicate with conduit 78. Branch conduits 88 and 88' communicate with conduit 86 and are in communication with each other.

The controls for the two cylinders 50 are the same, so that the control for one will be described in detail and the control for the other will be indicated by corresponding primed numerals.

The conduit 84 communicates with one end of a check valve housing 90, and the branch conduit 88 communicates with the opposite end thereof. The interior of the valve housing is divided into a pair of chambers 92 and 94. A valve seat 96 is provided in chamber 94. A valve plunger is disposed within the chamber having a stem 97 which is slidably received within an aperture between chambers 92 and 94. A valve 98 is formed on one end of the stem 97 and is adapted to seat against valve seat 96. A cylindrical piston 100 is formed on the opposite end of the stem 97 and is adapted to be slidably received within the cylindrical chamber 92. A coil spring 102 embraces the stem 97 and abuts against one face of the piston 100 and against the facing wall through which the stem 97 projects to urge the valve 98 away from its seat 96.

A conduit 104 communicates the chamber 94 with the upper end of the cylinder 50. A conduit 106 communicates with the chamber 92 on the side of the valve piston 100 opposite to that with which the conduit 94 communicates with the chamber 92. The conduit 106 communicates with the return conduit 80 and also with a conduit 108, which communicates with the lower end of the cylinder 50 through a conduit 110.

The conduit 106' and the conduit 110' are in communication with the conduits 108, 110 and 80 through an interconnecting conduit 112.

The conduit 86 communicates through a conduit 114 with a conduit 116. Such conduit 116 connects with conduits 104 and 104'. Check valves 118 and 118' are inserted in conduit 116 and are so positioned that fluid under pressure in lines 104 and 104' cannot pass to conduit 114. A shut-off valve 120 is interposed in conduit 114.

In the operation of the device above described for a hoisting operation, the valve 82 is open and the valve 120 is closed. With the pump operating and with the valve 64 set for the introduction of fluid under pressure into conduit 78, fluid under pressure enters conduits 84, 86 and 88. The spring 102 holds the valve 98 open, since the fluid pressure in lines 78, 84, 86 and 84' is low or practically nil until the plates 58 engage the ground; and the fluid under pressure thus passes through conduit 104 to force the ground engaging member 58 downwardly into engagement with the ground. The ground engaging member of the other cylinder is correspondingly forced downwardly through valve 90'. As soon as the ground engaging members 58 engage the ground, fluid under pressure builds up in conduits 104 and 104'. This causes the pressure in conduits 84 and 84' to correspondingly build up and act on piston 100 and 100' to close the valves 98 and 98' against the action of springs 102 and 102'. It will be understood that the area of the valve 98 acted upon by the fluid is less than the area of the piston 100. The valve 98 is thus held closed.

Since valve 120 is already closed, no further fluid passes into the cylinders 50. The ground engaging members 58 are thus rigidly held in position firmly on the ground, but there is no tendency for these stabilizing jacks to then act as lifting jacks and raise the chassis frame of the truck. This back pressure, which builds up in conduit 78, thereupon passes through conduit 48 to the lower ends of the cylinders 32 of the lifting jacks to thus extend the jacks and dump the body about pivots 28. It will be obvious that the weight of the body will insure that the ground engaging members are first moved into engagement with the ground before the fluid under pressure can be effective in the lifting jacks 32 to raise the body.

After the dumping operation has been performed and the pressure in the line relieved by shifting the valve 64 to its other position, the body will return to its position on the chassis frame by gravity, in that the fluid from the cylinders 32 will pass through conduits 48 and 78 through valve 64 into return line 72.

In order to raise the stabilizing members 58, it is necessary for fluid under pressure to be passed through conduit 80. Fluid under pressure in conduit 80 will pass through conduits 106, 108 and also through conduits 112 and 106'. That fluid under pressure which flows through conduits 106 and 106' will enter the spring compartments 92 and 92' and act upon pistons 100 and 100', thereby opening valves 98 and 98' so that fluid from the stabilizing jack cylinders 50 can be exhausted through conduits 88, 88', 86, 78, valve 64 and return line 72. Fluid under pressure in conduits 110 and 110' will pass into the lower end of the jack cylinders 50 and act on the under side of the jack pistons to raise the ground engaging members 58 to their extreme top position.

It will be understood that when the feet 58 engage uneven ground so that one of the ground engaging members 58 engages first, the other member will continue until it also engages the ground, since the inlet conduits 104 and 104' intercommunicated through conduits 88 and 88'. Thus, although one of the members 58 may engage first, the hoisting jack 32 will not be operated to tilt the body until the other ground engaging member has similarly engaged the ground. The stabilizing means is thus effective when used on uneven ground, which is the usual case.

While the primary function of the jacks 50 is to act as a stabilizer during the hoisting operation, it will be understood that such jacks may in addition serve to support the front end of the semi-trailer chassis frame when the motor tractor is disconnected. To accomplish this, the valve 82 is closed and the valve 120 is opened. This permits the fluid under pressure from conduit 78 to pass through conduits 86 and 114 to conduit 116. At the initial stages the fluid flows through valves 90 and 90', the same as above described, to lower the feet 58, as well as through conduit 116. When the feet first engage the ground the pressure builds up in conduits 84 and 84', as above described, to close valves 98 and 98'. However, fluid under pressure continues through conduit 114, and the check valves 118 and 118' will open against such pressure from conduit 114 to pass the fluid under pressure through conduits 104 and 104' to the upper ends of the cylinders 50 to force the ground engaging members 58 downwardly thereby to raise the semi-trailer to a level higher than the engaged portion of the trailer. Thereupon, the tractor may be disconnected and the semi-trailer is supported on the stabilizing jacks. With the forward end of the trailer higher than the rear of the tractor, there is no difficulty in reconnecting the two.

While not shown, it will be understood that the tank 60, pump 62 and valve 64 are mounted on the motor tractor. The conduits 70 and 78 are formed in separable sections with the usual separable connections 130 and shut-off valves 132 provided therein, so that such conduits may be broken and shut-off when the tractor and trailer are separated from each other.

It will also be understood that while the invention is specifically illustrated with a semi-trailer, that according to the broader aspects of the invention it is useful with other types of vehicles as well, such as trucks having long chassis where it is desired to stabilize the frame during dumping.

What is claimed is:

1. In a vehicle dump body construction, a chassis, a dump body, pivot means pivotally mounting said body to said chassis for tilting movement with respect thereto about the rear end thereof, hydraulically actuated tilting means connected to said body and to said chassis forwardly of said pivot means for tilting said body, an hydraulically actuated movable means mounted on said chassis forwardly of said pivot means in the region of connection of said last-named means with the chassis and movable into engagement with the vehicle supporting surface to thereby reinforce the chassis during the tilting of the body, and means providing an hydraulic circuit for supplying fluid under pressure to said hydraulically actuated means.

2. In a vehicle dump body construction, a chassis, a dump body, pivot means pivotally mounting said body to said chassis for tilting movement with respect thereto about the rear end thereof, hydraulically actuated tilting means connected to said body and to said chassis forwardly of said pivot means for tilting said body, an hydraulically actuated movable means mounted on said chassis forwardly of said pivot means in the region of connection of said last-named means with the chassis and movable into engagement with the vehicle supporting surface to thereby reinforce the chassis during the tilting of the body, and means providing an hydraulic circuit for supplying fluid under pressure to said hydraulically actuated means, said last-named means being so constructed that said movable means is moved into engagement with the vehicle supporting surface prior to actuation of said tilting means.

3. In a vehicle dump body construction, a chassis, a dump body, means pivotally mounting said body to said chassis for tilting movement with respect thereto, a hydraulic jack connected to said body and to said chassis for tilting said body, another hydraulic jack mounted on said chassis in the region of connection of said last-named means with the chassis and movable into engagement with the vehicle supporting surface to thereby reinforce the chassis during the tilting of the body, and means providing an hydraulic circuit for supplying fluid under pressure to said hydraulic jacks, said last-named means including a common pressure inlet conduit associated with both of said jacks to extend said jacks, a check valve in said inlet conduit operable to close upon the building up of pressure in said conduit after said another jack engages said supporting surface, a by-pass conduit around said check valve and associated with said another jack for the introduction of fluid under pressure thereto to extend the same, and a check valve in said by-pass conduit to prevent the return of fluid therethrough.

4. In combination, an elongated supporting frame adapted to be supported on a surface, a load carrying member, pivot means pivotally mounting said member to said frame adjacent one end thereof for tilting movement with respect thereto about the rear end thereof, an hydraulic jack connected to said member and to said frame forwardly of said pivot means for tilting said member, another hydraulic jack mounted on said member forwardly of said pivot means in the region of connection of said first-named jack with the frame and movable into engagement with the frame supporting surface to thereby reinforce the frame during the tilting of the member, and means providing an hydraulic circuit for supplying fluid under pressure to said jacks, said last-named means including a common pressure inlet conduit associated with both of said jacks to extend said jacks whereby said another jack engages said supporting surface prior to extension of said first-named jack.

LOUIS S. WOOD.